United States Patent [19]

Muchenberger

[11] Patent Number: 5,761,057
[45] Date of Patent: Jun. 2, 1998

[54] SWITCHED MODE POWER SUPPLY WITH SYNCHRONOUS PRECONVERTER

[75] Inventor: Manfred Muchenberger, Zurich, Switzerland

[73] Assignee: Thomson Consumer Electronics, Inc., Indianapolis, Ind.

[21] Appl. No.: 465,399

[22] Filed: Jun. 5, 1995

[30] Foreign Application Priority Data

Mar. 9, 1995 [GB] United Kingdom ............ 9504755
Apr. 24, 1995 [GB] United Kingdom ............ 9508288

[51] Int. Cl.[6] ........................................ H02M 3/335
[52] U.S. Cl. ........................ 363/21; 315/411; 363/124
[58] Field of Search ...................... 363/21, 89, 124; 315/411, 307

[56] References Cited

U.S. PATENT DOCUMENTS

| | | | |
|---|---|---|---|
| 4,034,280 | 7/1977 | Cronin et al. | 363/124 X |
| 5,187,414 | 2/1993 | Fellows et al. | 315/307 |
| 5,349,515 | 9/1994 | Megeid | 363/21 |
| 5,349,516 | 9/1994 | Megeid | 363/21 |
| 5,351,177 | 9/1994 | Megeid | 363/21 |
| 5,402,330 | 3/1995 | Megeid | 363/21 |

OTHER PUBLICATIONS

Data Sheet for the LT1509 Power Factor and PWM Controller, published in 1995 in the USA by Linear Technology Corporation.

*Primary Examiner*—Peter S. Wong
*Assistant Examiner*—Y. J. Han
*Attorney, Agent, or Firm*—Joseph S. Tripoli; Joseph J. Laks; Marion P. Metelski

[57] ABSTRACT

A power supply comprises: a rectifier; a power preconverter coupled to the rectifier; a switched-mode power supply circuit coupled to the power preconverter; and, a phase control circuit for synchronizing operation of the power preconverter with operation of the switched-mode power supply circuit. An energy storage device may be coupled to the power preconverter and to the switched-mode power supply circuit. A preconverter switch conducts during each time interval that a power switch in the switched-mode power supply circuit conducts in order, for example, to charge the energy storage device. The preconverter switch begins conducting only after each time interval begins and always stops conducting before each time interval ends. In a portion of the time interval after the preconverter switch has stopped conducting, a current can flow directly from the power preconverter to the switched-mode power supply circuit without, for example, charging the energy storage device.

24 Claims, 5 Drawing Sheets

SWITCHED MODE POWER SUPPLY WITH SYNCHRONOUS PRECONVERTER

BACKGROUND OF THE INVENTION

1. Field of the Invention

This invention relates generally to the field of switched-mode power supplies, and, in particular, to switched-mode power supplies employing preconverter circuits to effect power factor correction.

2. Description of Prior Art

An off-line switched-mode power supply may consist of a rectifier stage cascaded with a DC—DC converter stage. The rectifier stage itself consists of a rectifier section and a filter section. The rectifier section uses semiconductor power rectifiers to convert the mains voltage into a pulsating DC voltage. This DC voltage is then filtered by capacitors in the filter section to obtain a DC voltage that has relatively low ripple.

One consequence of using capacitors in the filter section is that the resulting input current waveform consists of current pulses corresponding to the peaks of the mains voltage. This happens because the rectifier diodes cannot conduct current until the mains voltage exceeds the filter capacitor's voltage. As a result, the power supply only draws power at the peaks of the mains voltage, which results in a poor power factor at the input to the power supply.

One method for improving the power factor at the input to the power supply is to place a boost-type DC—DC preconverter between the rectifier section and the filter section. The preconverter effects a power factor correction by allowing the input rectifiers to conduct sooner and conditions the input current to be sinusoidal and in phase with the mains voltage. A prior art switched-mode power supply with a boost-type DC—DC preconverter is shown in FIG. 8. Power from the mains is rectified and fed to the preconverter. In the preconverter, a power factor controller, such as a Siemens TDA4815, controls preconverter switch Q2. Energy is stored in inductor L1 during the "on" time of preconverter switch Q2. This energy is transferred to a storage capacitor C1 by a charge current $i_{charge}$ through a diode D1 during the "off" time of preconverter switch Q2, and is ultimately provided to the input of the switched-mode power supply as an input current $i_1$.

A problem with the prior art arises from the fact that preconverter switch Q2 switches asynchronously with respect to power switch Q1 of the switched-mode power supply. This asynchronous switching results in a random phase relationship between charge current $i_{charge}$ through diode D1 and input current $i_1$ to the switched-mode power supply.

SUMMARY OF THE INVENTION

Establishing a more optimal phase relationship between charge current $i_{charge}$ and input current $i_1$ by synchronizing switching of preconverter switch Q2 and power switch Q1 would reduce the total rms current through storage capacitor C1, which is desirable for several reasons. The use of a synchronous preconverter eases the specifications for storage capacitor C1, thus allowing for the use of standard, low cost components. The life expectancy of a given storage capacitor C1 can be extended or a lower cost capacitor can be used instead. The voltage rating for storage capacitor C1 can also be reduced. The harmonic components of a mains current $i_{mains}$ can be further attenuated from present levels. A ripple voltage at the output of the switched-mode power supply can be reduced. Finally, when used with a flyback-topology switched-mode power supply in a television, the synchronous preconverter switches "off" when the television is operating in "standby" mode.

Briefly stated, a power supply according to an inventive arrangement taught herein results in a reduction of the total rms current flowing through the filter section of the power supply. The operation of a switched-mode power supply circuit is synchronized with the operation of a preconverter circuit so that an input current flows directly from the preconverter circuit to the switched-mode power supply circuit during a portion of each time interval that the switched-mode power supply circuit draws an input current.

Accordingly, a power supply according to an inventive arrangement taught herein comprises: rectifying means; power preconverting means coupled to the rectifying means; a switched-mode power supply circuit coupled to the power preconverting means; and, means for synchronizing operation of the power preconverting means with operation of the switched-mode power supply circuit.

A power supply according to a further inventive arrangement taught herein comprises: rectifying means; power preconverting means coupled to the rectifying means; energy storage means coupled to the power preconverting means; a switched-mode power supply circuit coupled to the power preconverting means and to the energy storage means; and, means for synchronizing operation of the power preconverting means with operation of the switched-mode power supply circuit.

A power supply according to another inventive arrangement taught herein comprises: rectifying means; power preconverting means coupled to the rectifying means; energy storage means coupled to the power preconverting means; a switched-mode power supply circuit coupled to the power preconverting means and to the energy storage means; and, means for supplying a current from the power preconverting means directly to the switched-mode power supply circuit during a portion of each time interval that the switched-mode power supply circuit draws an input current.

The switched-mode power supply circuit and the power preconverting means may comprise first and second switch means, respectively. A control circuit in the power preconverting means may compare the amplitude of a ramp signal, keyed to operation of the switched-mode power supply circuit, to lower and upper reference voltages. Conduction of the second switch means in the power preconverting means may be enabled whenever the ramp signal is between the lower and upper reference voltages. The second switch means in the power preconverting means may conduct during each time interval that the first switch means in the switched-mode power supply circuit conducts, beginning only after each time interval begins and always stopping before each time interval ends. In a portion of the time interval after the second switch means has stopped conducting, a current may flow directly from the power preconverting means to the switched-mode power supply circuit.

The above, and other features and advantages of the present invention will become apparent from the following description read in conjunction with the accompanying drawings, in which like reference numerals designate the same elements.

3

Figure 2:
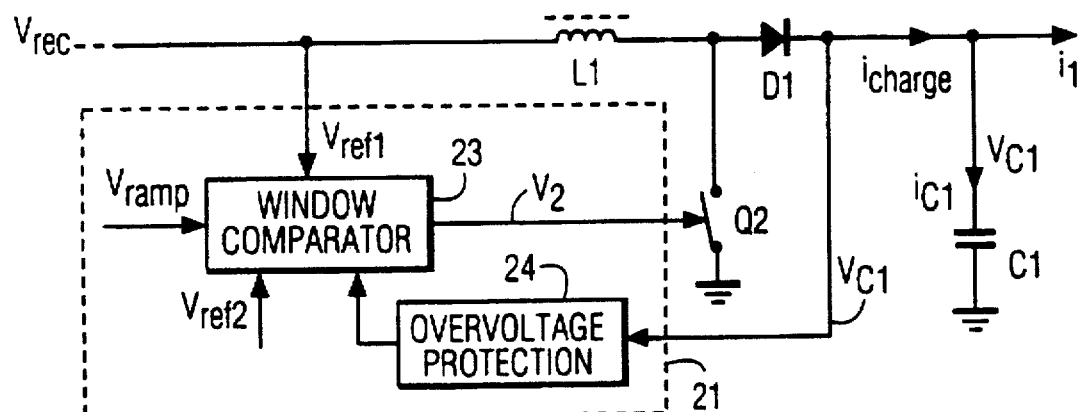

FIG. 2 is a block diagram of a control circuit used in a switched-mode power supply having an inventive arrangement.

Figure 3:
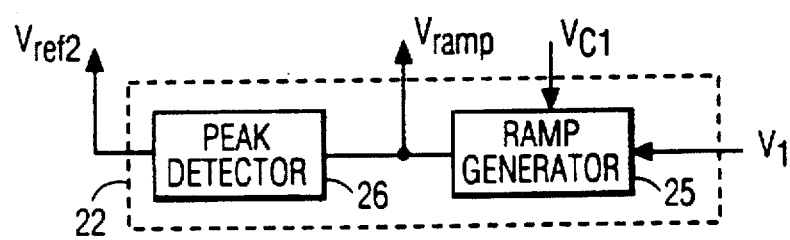

FIG. 3 is a block diagram of a phase-offset circuit used in a switched-mode power supply having an inventive arrangement.

FIG. 4 shows particular voltage and current waveforms associated with a switched-mode power supply having an inventive arrangement.

Figure 5:
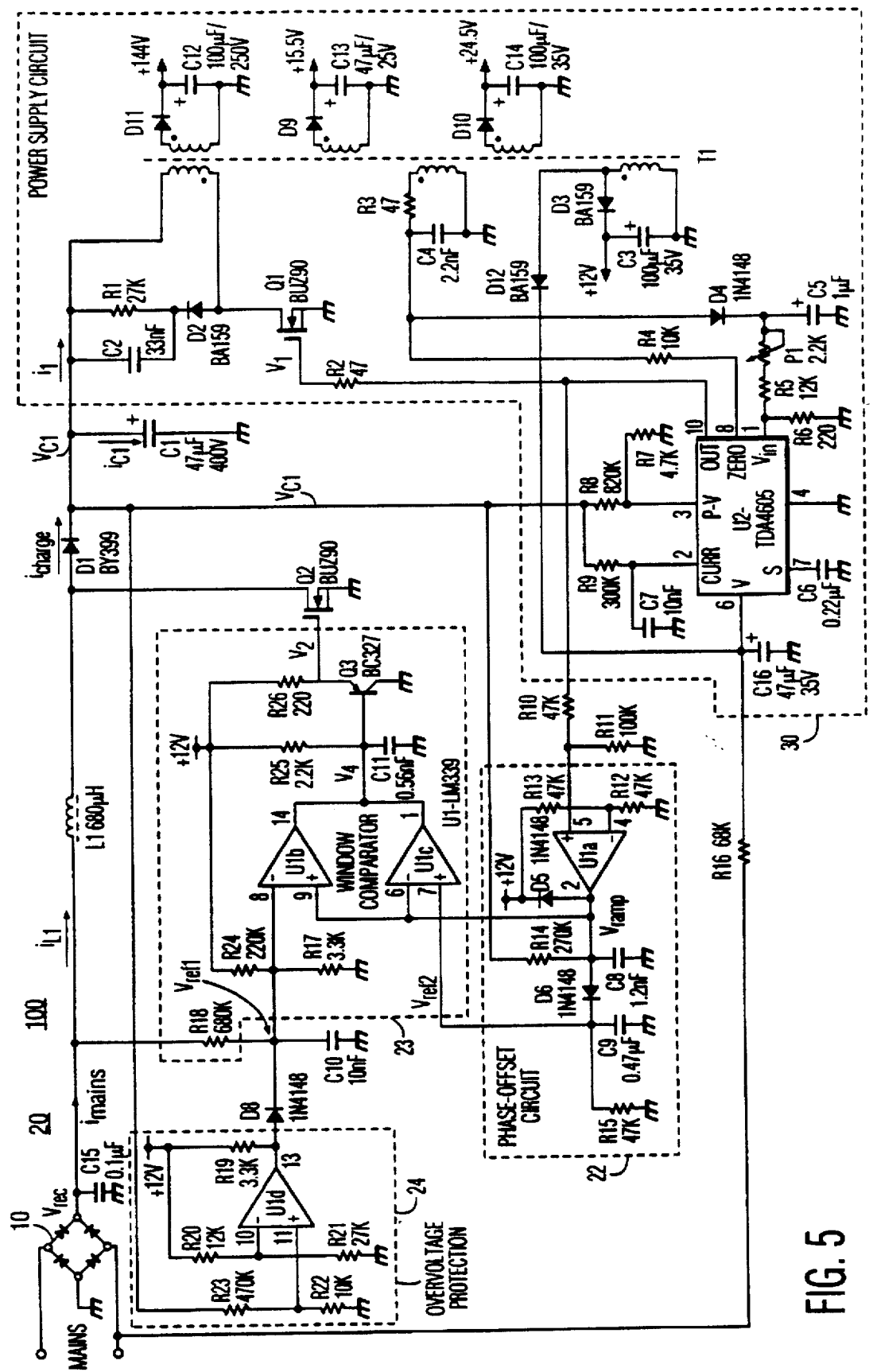

FIG. 5 is a schematic diagram of a presently preferred embodiment of a switched-mode power supply having an inventive arrangement.

Figure 6:
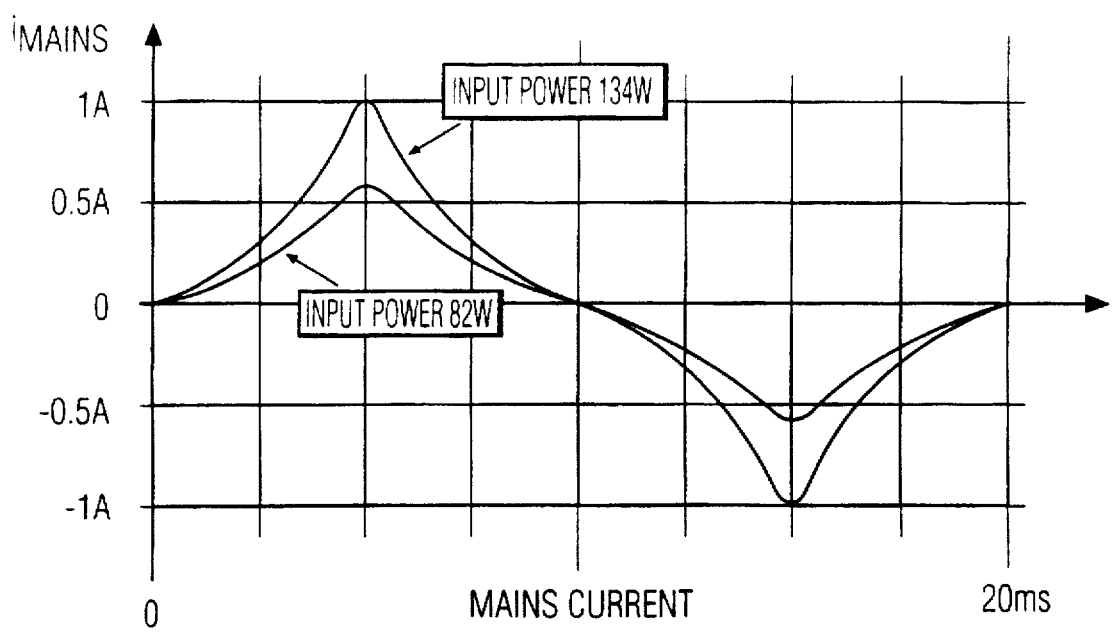

FIG. 6 is a diagram of the mains current drawn by a presently preferred embodiment of a switched-mode power supply having an inventive arrangement.

Figure 7:
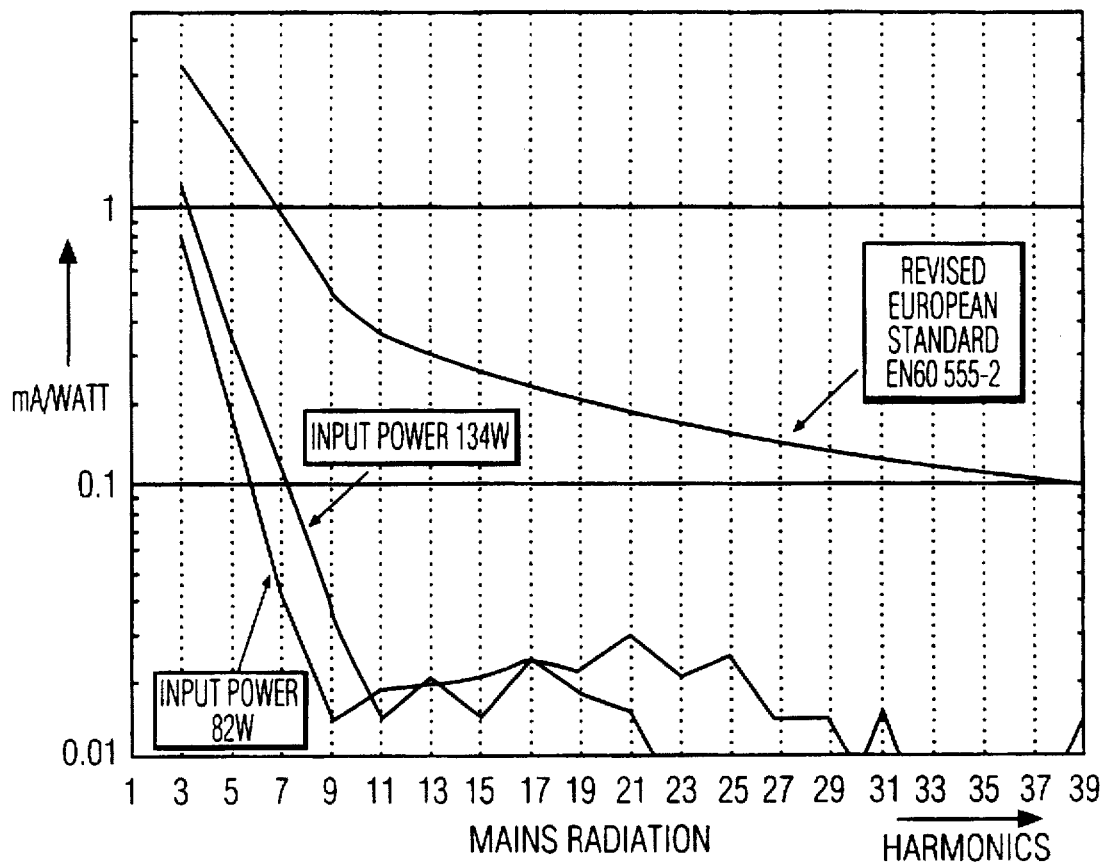

FIG. 7 is a diagram of the harmonic content of the mains current drawn by a presently preferred embodiment of a switched-mode power supply having an inventive arrangement.

Figure 8:
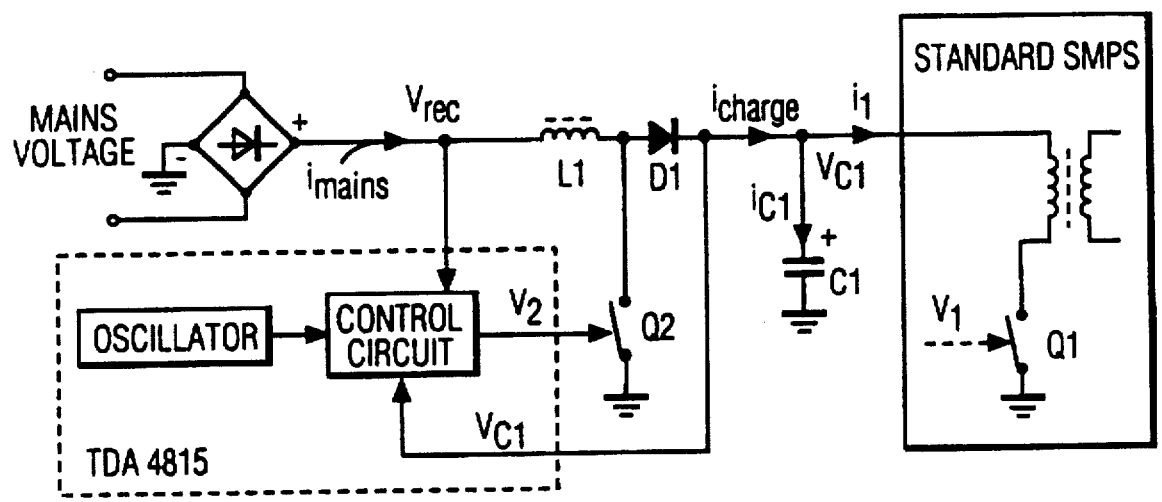

FIG. 8 is a diagram, in block and schematic form, of a prior art switched-mode power supply.

DETAILED DESCRIPTION OF THE PREFERRED EMBODIMENTS

Figure 1:
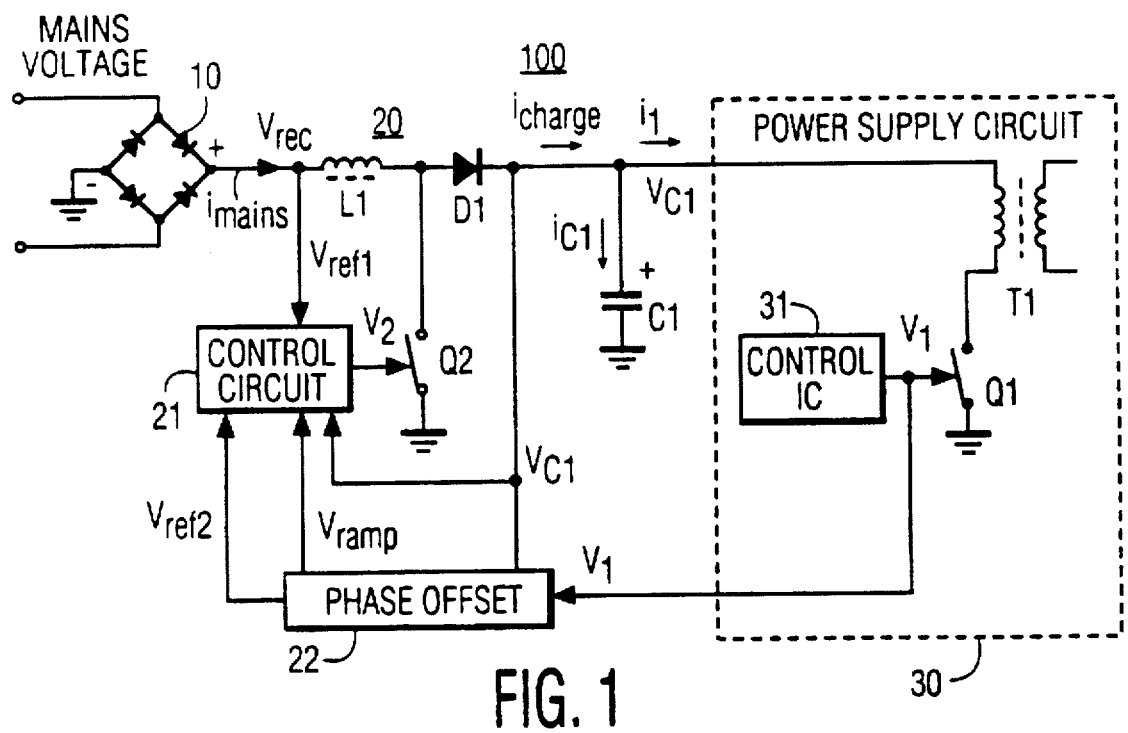
FIG. 1 is a diagram, in block and schematic form, of a switched-mode power supply having an inventive arrangement.

A power supply 100 that provides a more optimal phase relationship between a charge current $i_{charge}$ and an input current $i_1$ is shown in FIGS. 1, 2 and 3. Voltage and current waveforms for power supply 100 are shown in FIG. 4.

Power supply 100 includes a switched-mode power supply circuit 30 coupled to a full-wave rectifier 10 by a preconverter 20, for use in a television. A control IC 31 of switched-mode power supply circuit 30 provides a drive signal $V_1$, shown in FIG. 4(a), to turn a power switch Q1 "on" and "off". The "on" time of power switch Q1 is determined by a load coupled to an output of switched-mode power supply circuit 30. A phase-offset circuit 22 uses drive signal $V_1$ to synchronize switching of a preconverter switch Q2 of preconverter 20 with power switch Q1 of switched-mode power supply circuit 30. By so synchronizing the switching of preconverter switch Q2 with the switching of power switch Q1, the charge current $i_{charge}$ supplied to storage capacitor C1 by preconverter circuit 20 is modulated in response to the load coupled to an output of switched-mode power supply circuit 30.

Figure 4A:
Figure 4B:
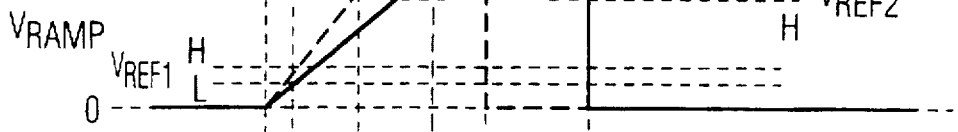
Figure 4C:
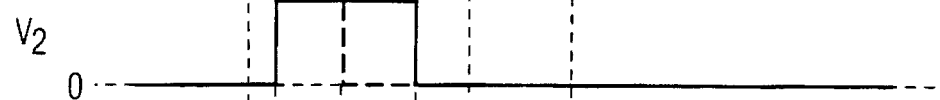
Figure 4D:
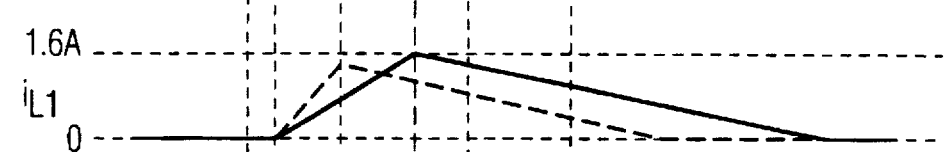
Figure 4E:
Figure 4F:

Drive signal $V_1$ for power switch Q1 determines a duration for a ramp signal $V_{ramp}$, which is generated by ramp generator 25 and is shown in FIG. 4(b), and a voltage $V_{C1}$ of storage capacitor C1 determines a slope for ramp signal $V_{ramp}$. Ramp signal $V_{ramp}$ is compared to two reference voltages, an upper reference voltage $V_{ref2}$ and a lower reference voltage $V_{ref1}$, both shown in FIG. 4(b), in a window comparator circuit 23. When ramp signal $V_{ramp}$ is between upper and lower reference voltages $V_{ref2}$ and $V_{ref1}$, respectively, a drive signal $V_2$ for preconverter switch Q2 goes "high", as shown in FIG. 4(c), and preconverter switch Q2 turns "on".

Upper reference voltage $V_{ref2}$ is lower than ramp voltage $V_{ramp}$ by the forward voltage drop of a diode (not shown) to achieve a phase offset between preconverter switch Q2 and power switch Q1, meaning that preconverter switch Q2 turns "off" before power switch Q1 turns "off". While power switch Q1 is "on" but preconverter switch Q2 is still "off", that part of charge current $i_{charge}$ that flows directly into a transformer T1 through an inductor L1 and a diode D1 of preconverter 20 without being stored in a storage capacitor C1 is represented by the shaded areas in FIGS. 4(e) and 4(f).

4

Figure 4G:

Upper and lower reference voltages $V_{ref2}$ and $V_{ref1}$ are modulated in response to line and load conditions, as shown in FIG. 4(b). In order to maximize that part of charge current $i_{charge}$ flowing directly into transformer T1 without being stored in storage capacitor C1, upper reference voltage $V_{ref2}$ is modulated proportionally to the peak of ramp voltage $V_{ramp}$ so that upper reference voltage $V_{ref2}$ is lower than ramp voltage $V_{ramp}$ by the forward voltage drop of a diode (not shown). In this way, the slope of ramp signal $V_{ramp}$ is modulated by storage capacitor voltage $V_{C1}$ such that preconverter switch Q2 turns "off" sooner as storage capacitor voltage $V_{C1}$ increases and stays "on" longer as storage capacitor voltage $V_{C1}$ decreases. Thus, as the "on" time of preconverter switch Q2 varies according to variations in line and load conditions, the rms value of a storage capacitor current $i_{C1}$, shown in FIG. 4(g), is reduced, and the power factor and storage capacitor voltage $V_{C1}$ become more independent of the load.

Lower reference voltage $V_{ref1}$ is modulated proportionally to a rectified mains voltage $V_{rec}$ so that the time during which preconverter switch Q2 is "on" is reduced as rectified mains voltage $V_{rec}$ is increased. This is done by delaying the time at which preconverter switch Q2 turns "on" by deriving lower reference voltage $V_{ref1}$ from rectified mains voltage $V_{rec}$, and it allows for a tradeoff between storage capacitor voltage $V_{C1}$ and a desired power factor.

If storage capacitor voltage $V_{C1}$ increases above a predetermined limit because of a fault in the circuit or because the television is operating in "standby" mode, an overvoltage protection circuit 24 pulls lower reference voltage $V_{ref1}$ above upper reference voltage $V_{ref2}$, thus turning preconverter 20 "off".

A more detailed implementation of a synchronous preconverter 20 combined with a switched-mode power supply circuit 30 for use in a television is shown in FIG. 5. Switched-mode power supply circuit 30 includes a pulse-width modulator U2, represented in FIG. 5 as a Siemens TDA4605-2, coupled to power switch Q1, and transformer T1, which comprises a primary winding and a plurality of secondary windings. The primary winding of transformer T1 is coupled in series with power switch Q1 and each of the plurality of secondary windings of transformer T1 is coupled in series with either one of diodes D3, D9, D10, D11, D12 or with resistor R3.

Pulse-width modulator U2 provides power switch drive signal $V_1$ to a gate terminal of power switch Q1 through resistor R2. When power switch drive signal $V_1$ goes "high", power switch Q1 turns "on" and input current $i_1$ begins to flow through the primary winding of transformer T1 and through power switch Q1 to a reference voltage potential. As input current $i_1$ flows through the primary winding of transformer T1, energy is stored therein.

When power switch drive signal $V_1$ goes "low", power switch Q1 turns "off", so that the flow of input current $i_1$ through the primary winding of transformer T1 is interrupted. A magnetic field that built up in the primary winding of transformer T1 while power switch Q1 was "on" now collapses, so that the polarity of the primary winding reverses. All the energy stored in the primary winding is now delivered to a plurality of secondary windings of transformer T1. Each one of diodes D3, D9, D10, D11, D12 now becomes forward biased, and the secondary windings deliver energy to their respective loads through diodes D3, D9, D10, D11, D12 and through resistor R3.

Switched-mode power supply circuit 30 is coupled to preconverter 20 through phase offset circuit 22, which includes comparator U1a, resistors R12, R13, R14, diode D5 and capacitors C8, C9. Comparator U1a might be one of a plurality of comparators found in an integrated circuit U1, such as the National Semiconductor LM339, as shown in FIG. 5. Using storage capacitor voltage $V_{C1}$ and power switch drive voltage $V_1$, phase-offset circuit 22 determines the shape of ramp signal $V_{ramp}$ and, hence, the phase offset between preconverter switch Q2 and power switch Q1.

As power switch drive signal $V_1$ of switched-mode power supply circuit 30 goes "high", the output of comparator U1a goes "high", allowing storage capacitor voltage $V_{C1}$ to charge capacitor C8 through resistor R14, thus generating the positively-sloped portion of ramp signal $V_{ramp}$. Diode D5 limits the voltage across capacitor C8, and thus the peak voltage of ramp signal $V_{ramp}$, to +12 volts. When the output of comparator U1a goes "low", capacitor C8 discharges through the open collector output of comparator U1a.

Phase-offset circuit 22 further includes a peak-detector circuit 26, comprising diode a D6, a capacitor C9 and a resistor R15. Peak-detector circuit 26 limits ramp signal $V_{ramp}$ and produces upper reference voltage $V_{ref2}$. A forward voltage drop of diode D6 sets the level of upper reference voltage $V_{ref2}$ to 0.7 volts below a peak of ramp signal $V_{ramp}$.

Window comparator circuit 23 comprises comparators U1b, U1c; resistors R17, R18, R24, R25, R26; and gate-discharge transistor Q3. A voltage divider formed by resistors R17, R18 divides rectified mains voltage $V_{rec}$ to provide lower reference voltage $V_{ref1}$ to an inverting input of comparator U1b. Upper reference voltage $V_{ref2}$ is coupled from peak-detector circuit 26 to a non-inverting input of comparator U1c. Ramp signal $V_{ramp}$ is provided by phase-offset circuit 22 to both the non-inverting input of comparator U1b and the inverting input of comparator U1c. The outputs of comparators U1b, U1c are coupled to each other.

Window comparator output voltage $V_4$ is pulled "high" by resistor R25 if ramp signal $V_{ramp}$ is between lower reference voltage $V_{ref1}$ and upper reference voltage $V_{ref2}$. Capacitor C11 suppresses small spikes in window comparator output voltage $V_4$. When window comparator output voltage $V_4$ is "high", gate-discharge transistor Q3 is "off", and +12 volts is coupled to the gate terminal of preconverter switch Q2 through resistor R26, thereby turning "on" preconverter switch Q2. When ramp signal $V_{ramp}$ is below lower reference voltage $V_{ref1}$ or above upper reference voltage $V_{ref2}$, window comparator output voltage $V_4$ goes "low" and allows gate-discharge transistor Q3 to turn "on", thereby discharging the gate terminal of preconverter switch Q2, which then turns "off". Using gate-discharge transistor Q3 to open preconverter switch Q2 allows a fast turn-off time for preconverter switch Q2.

Overvoltage protection circuit 24 includes comparator U1d and resistors R19, R20, R21, R22, R23. A voltage divider formed by resistors R20, R21 provides an overvoltage threshold voltage at the inverting input of comparator U1d. Storage capacitor voltage $V_{C1}$ is divided by a voltage divider formed by resistors R22, R23, and the resulting voltage is provided to the non-inverting input of comparator U1d. If storage capacitor voltage $V_{C1}$ exceeds an overvoltage limit as determined by the overvoltage threshold voltage present at the inverting input of comparator U1d, the output of comparator U1d goes "high" and resistor R19 pulls up lower reference voltage $V_{ref1}$ through diode D8. Window comparator output voltage $V_4$ then goes "low", thereby allowing gate-discharge transistor Q3 to turn "on" and discharge the gate terminal of preconverter switch Q2, thereby opening preconverter switch Q2 and turning "off" preconverter 20.

Having described a presently preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power supply, comprising:
   rectifying means;
   a switched-mode power supply circuit having a first switch means;
   power preconverting means coupled between said rectifying means and said switched-mode power supply circuit, said preconverting means having a second switch means; and
   means for synchronizing operation of said power preconverting means with operation of said switched-mode power supply circuit by providing a phase offset between operation of said second switch means and operation of said first switch means.

2. The power supply of claim 1, wherein said power preconverting means provides said power supply with power factor correction.

3. The power supply of claim 2, wherein said power factor correction remains independent of a load coupled to an output of said switched-mode power supply circuit.

4. The power supply of claim 1, wherein said power preconverting means supplies a current only to said switched-mode power supply circuit within a portion of each time interval that occurs after said second switch means turns off and before said first switch means turns off.

5. A power supply, comprising:
   rectifying means;
   power preconverting means coupled to said rectifying means;
   a switched-mode power supply circuit coupled to said power preconverting means; and,
   means for synchronizing operation of said power preconverting means with operation of said switched-mode power supply circuit;
   said synchronizing means comprising:
       means for generating a ramp signal; and,
       means for generating an upper reference voltage having a value below a peak amplitude of said ramp signal.

6. A power supply according to claim 5, wherein said synchronizing means further comprises:
   means for generating a lower reference voltage; and,
   a comparator circuit having inputs coupled to said lower and upper reference voltages.

7. A power supply according to claim 6, wherein said means for generating said lower reference voltage is coupled to said rectifying means.

8. A power supply according to claim 7, wherein said comparator circuit enables conduction of a preconverter switch while said ramp signal is between said lower and upper reference voltages.

9. A power supply, comprising:
   rectifying means;
   power preconverting means coupled to said rectifying means;
   energy storage means coupled to said power preconverting means;
   a switched-mode power supply circuit coupled to said power preconverting means and to said energy storage means; and, means for synchronizing operation of said power preconverting means with operation of said switched-mode power supply circuit to reduce a root-mean-square value of a current flowing through said energy storage means.

10. The power supply of claim 9, wherein a voltage across said energy storage means is independent of a load coupled to an output of said switched-mode power supply circuit.

11. The power supply of claim 9, wherein said switched-mode power supply circuit and said power preconverting means have first and second switch means, respectively, said synchronizing means controlling a phase relationship in operation of said second switch means in said power preconverting means relative to operation of said first switch means in said switched-mode power supply circuit.

12. The power supply of claim 11, wherein said second switch means in said power preconverting means conducts during each time interval that said first switch means in said switched-mode power supply circuit conducts.

13. The power supply of claim 12, wherein said second switch means in said power preconverting means conducts for a period of time shorter than said time interval.

14. The power supply of claim 13, wherein said second switch means in said power preconverting means begins conducting only after said time interval begins and always stops conducting before said time interval ends.

15. A power supply, comprising:
rectifying means;
power preconverting means coupled to said rectifying means;
energy storage means coupled to said power preconverting means;
a switched-mode power supply circuit coupled to said power preconverting means and to said energy storage means; and,
means for synchronizing operation of said power preconverting means with operation of said switched-mode power supply circuit;
said synchronizing means comprising:
means for generating a ramp signal; and,
means for generating an upper reference voltage having a value below a peak amplitude of said ramp signal.

16. A power supply according to claim 15, wherein said synchronizing means further comprises:

means for generating a lower reference voltage; and,
a comparator circuit having inputs coupled to said lower and upper reference voltages.

17. A power supply according to claim 16, wherein said means for generating said lower reference voltage is coupled to said rectifying means.

18. A power supply according to claim 17, wherein said comparator circuit initiates conduction of a preconverter switch while said ramp signal is between said lower and upper reference voltages.

19. The power supply of claim 15, wherein a time duration of said ramp signal is determined by a signal derived from said switched-mode power supply circuit.

20. The power supply of claim 19, therein a slope of said ramp circuit is determined by a voltage across said energy storage means.

21. A power supply, comprising:
rectifying means;
a switched-mode power supply circuit having a first switch means;
energy storage means coupled to said switched-mode power supply circuit; and
power preconverting means coupled to said rectifying means for supplying a current to said energy storage means and to said switched-mode power supply circuit, said preconverting means having a second switch means; and
means for supplying a current from said power preconverting means only to said switched-mode power supply circuit within each time interval that occurs after said second switch means turns off and before said first switch means turns off.

22. The power supply of claim 21, wherein said current charges said energy storage means during a first portion of said time interval.

23. The power supply of claim 22, wherein said current is supplied to said switched-mode power supply circuit during a second portion of said time interval that is subsequent to said first portion.

24. The power supply of claim 23, wherein said second portion of said time interval comprises a remainder of said time interval after said first portion.

* * * * *